United States Patent [19]

Yamada

[11] Patent Number: 4,642,680

[45] Date of Patent: Feb. 10, 1987

[54] METHOD AND SYSTEM FOR PROCESSING IMAGE DATA STORED IN RGB FORM

[75] Inventor: Mitsuhiko Yamada, Kyoto, Japan

[73] Assignee: Dainippon Screen Mfg. Co., Ltd., Kyoto, Japan

[21] Appl. No.: 528,891

[22] Filed: Sep. 2, 1983

[30] Foreign Application Priority Data

Dec. 14, 1982 [JP] Japan .................. 57-219797

[51] Int. Cl.⁴ .............................. H04N 1/46
[52] U.S. Cl. ......................... 358/78; 358/75
[58] Field of Search ............. 358/75, 76, 77, 78, 358/80

[56] References Cited

U.S. PATENT DOCUMENTS

| 3,742,129 | 6/1973 | Roberts et al. | 358/78 |
| 3,956,583 | 5/1976 | Pugsley | 358/78 |
| 4,007,362 | 2/1977 | Sindermann | 358/264 |
| 4,270,141 | 5/1981 | Sakamoto | 358/78 |
| 4,320,419 | 3/1982 | Cottriall | 358/75 |
| 4,327,380 | 4/1982 | Yamada et al. | 358/264 |
| 4,338,636 | 7/1982 | Yamada et al. | 358/75 |
| 4,350,997 | 9/1982 | Yamada | 358/78 |
| 4,410,909 | 10/1983 | Ueda et al. | 358/75 |
| 4,468,692 | 8/1984 | Yamada et al. | 358/80 |
| 4,470,074 | 9/1984 | Yamada | 358/287 |
| 4,486,788 | 12/1984 | Yamada | 358/298 |
| 4,500,917 | 2/1985 | Yamada | 358/75 |

FOREIGN PATENT DOCUMENTS

| 2519734 | 11/1975 | Fed. Rep. of Germany . |
| 2430762 | 1/1976 | Fed. Rep. of Germany . |
| 102825 | 8/1979 | Japan | 358/75 |
| 1582953 | 1/1981 | United Kingdom . |
| 2063005 | 5/1981 | United Kingdom . |

Primary Examiner—James J. Groody
Assistant Examiner—Randall S. Svihla
Attorney, Agent, or Firm—Lowe Price Leblanc Becker & Shur

[57] ABSTRACT

In an image reproducing system, a memory stores B (Blue), G (Green) and R (Red) color component data instead of color separation data Y (Yellow), M (Magenta), C (Cyan) and K (Black) thus permitting the use of a reduced storage capacity memory. The B, G, R signals are converted to Y, M, C, K for output to a recording module, while internal processing is performed on the B, G, R signals. Screen tint generation or flat tone generation operations are performed on the B, G, R data as needed, at least one of the B, G, R signals being specially encoded to identify generation of a flat tone.

14 Claims, 5 Drawing Figures

METHOD AND SYSTEM FOR PROCESSING IMAGE DATA STORED IN RGB FORM

FIELD OF THE INVENTION

This invention relates to a method and system for processing image data in reproducing images, particularly to such a method and system which is capable of storing image data into a memory having a storage capacity which is less than a conventional memory.

BACKGROUND OF THE INVENTION

As a means for obtaining color separation images Y (Yellow), M (Magenta), C (Cyan) and K (Black) necessary for color printing, an image reproducing system such as a color scanner is used. Recently a so-called layout color scanner (system) has been put to practical use in some fields. The function of such a system is to record plural images, including letter components, as well as to perform layout operations such as magnification conversion and positioning.

This kind of color scanner system, having functions of performing layout and image correction, obtains color component data B (Blue), G (Green) and R (Red) by scanning an original picture, performing color and gradation correction and magnification conversion on the color component data B, G and R, and converting the processed data B, G, and R into color separation data Y, M, C and K to produce color separation images Y, M, C and K. In this process, said color separation data Y, M, C and K are stored into a large capacity input memory such as a disc memory and are used as data for layout operations or image correction by being read directly from the large capacity input memory or from a memory provided in the image reproducing system to which said data are transferred beforehand. Meanwhile, oridinarily a large volume of image data is involved. For example, if 100 M byte storage capacity is necessary for data of one color separation, a total of 400 M byte capacity is required for data of four color separations. In addition, because of an increase in output data volume required in performing layout operations on the scanner, the memory capacity must be still larger. Moreover, output said large capacity memory, which may be a disc memory, is so expensive that it may account for virtually the entire cost of the system, which also requires efficient use of the memory.

Thus, in order to permit a reduced memory capacity, the following method is proposed. The proposed method adopts steps of storing into an input memory B, G and R color component data obtained from an original picture using an input device such as a scanner, converting the color component data B, G and R read from the input memory into color separation data Y, M, C and K, performing layout operations such as assembly, color correction, and gradation correction on the color separation data Y, M, C and K, and storing the processed color separation data Y, M, C and K into an output memory.

However, the abovementioned method is still deficient in realizing a reduced memory capacity because the final data to be stored into the output memory are still four color separation data Y, M, C and K.

To resolve the above defect, the following method is proposed. This method adopts steps of storing color component data B, G and R obtained from an original picture into an input memory, performing no layout processing such as color gradation correction, or performing only assembling operations, on the color component data B, G and R, storing said color component data B, G and R into an output memory, and performing every kind of correction by using a calculator provided in the image reproducing system on the color component data B, G and R when they are read for use for recording an image.

However, originally a layout scanner must function to perform layout operations such as assembling or correction for images situated inside of line frames on four color separation data Y, M, C and K. Moreover screen tint generation or flat tone generation (wherein specified areas are expressed by the halftone in specified density and in specified color with an optional one or more of four color separation images Y, M, C and K) must be performed, and lines (including wide lines such as thick frames) and drawings, such as letters of designated colors, must be expressed in one of the separation colors.

But the latter method can only afford to manage three color component data B, G and R in the layout process and cannot produce a black image with one color component data, so it has not been put into practice. Precisely, when a ruled line is desired to be recorded with pure black in (K=100%), naturally Y, M and C color inks are not needed for recording the ruled line (Y=M=C=0%). While to express pure black, the color component data B, G and R must be ful density—(B=G=R=100%) which results in a calculation of the color separation data Y, M and C, when the color component data B, G and R are fixed in the above condition, to be a full density (Y=M=C=100%). Such a result makes the ruled line turbid and prevents it from being recorded with pure black.

SUMMARY OF THE INVENTION

One of the objects of this invention is to reduce data volume in order to permit a reduced memory capacity requirement, which leads to lower system cost, while retaining the conventional functions of a layout scanner system. The other object of this invention is to perform screen tint generation, and to record ruled lines and fine drawings in a practical manner. These objects resolve the abovementioned problems.

The above and other objects and features of this invention can be appreciated more fully from the following detailed description when read with reference to the accompanying drawings.

DETAILED DESCRIPTION OF A PREFERRED EMBODIMENT

Figure 1:
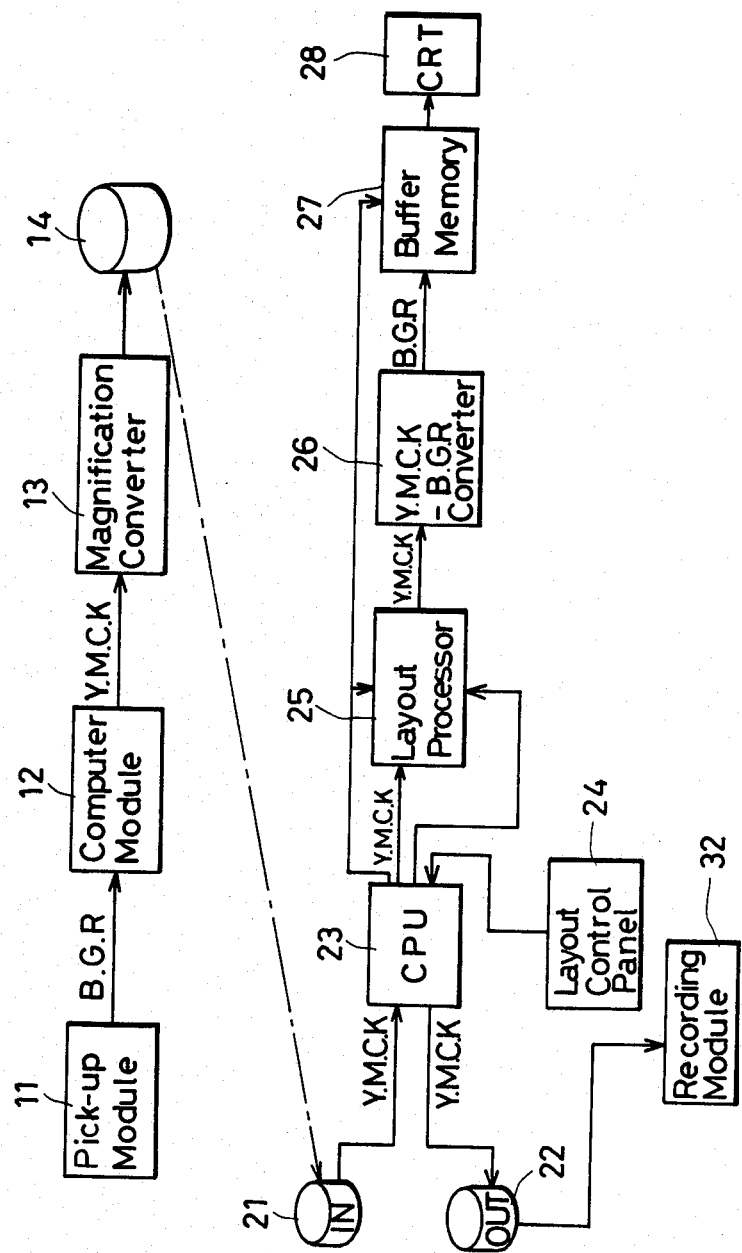
FIG. 1 is a block diagram of a conventional layout scanner system.

FIG. 1 is a block diagram of a conventional layout scanner system. A pick up module 11 shown in FIG. 1 obtains color component data B, G and R by scanning a full surface of an original picture placed on a drum which revolves around its axis, defining a main scanning direction, with the use of a scanning head which is fed in a direction perpendicular to the main scanning direction, i.e., in a sub-scanning direction. Said color component data are analog data, and are converted into digital data in an analog/digital converter (not shown in the drawings) provided before the computer module 12. This computer module 12 performs a number of functions, such as conversion from color component data B, G and R to color separation data Y, M, C and K, color and gradation correction, undercolor-removal, and sharpness emphasis, etc., if necessary. The color separation data Y, M, C and K output from the computer module 12 are then input to a magnification converter 13. In this example, magnification conversion of the sub-scanning factor is already performed in the pickup module 11, so that the magnification converter 13 converts magnification only of the main scanning factor. Though several methods of magnification conversion are known, explanations of the same are omitted because they are not the main theme of this invention.

The color separation data Y, M, C and K which have undergone magnification conversion are stored into a large capacity memory 14 such as a disc memory to undergo layout processing and image correction. In the embodiment shown in FIG. 1, although the magnification converter 13 is provided after the computer module 12, this order can be exchanged. It is necessary, however, that the color separation data Y, M, C and K must undergo magnification conversion before being input to the input memory 14. By repeating the abovementioned procedures for each original picture, the color separation data Y, M, C and K corresponding to every original picture which has undergone necessary image processing and magnification conversion are stored into the input memory 14.

The following is an explanation of layout processing using the color separation data Y, M, C and K. At first, the color separation data Y, M, C and K must be input to an internal memory 21, which may be done by using the input memory 14 including said data as the internal memory 21, or by transporting said data from the input memory 14 to a seprate internal memory 21.

The desired color separation data Y, M, C and K are then read from the internal memory 21 to a layout processor 25 by a central processing unit (CPU) 23. This layout processor 25 is, for example, an array processor composed of plural buffer memories, two-dimensional table, etc., the function of which is to perform positioning of images and correction of inside of line frames by using the color separation data Y, M, C and K according to designations from layout control panel 24 including components such as a digitizer and a joy stick. As the layout processor 25 is a mere part of this invention, a detailed explanation of the same is not necessary to be provided herein. Processed data Y, M, C and K from the layout processor 25 are input to a Y, M, C, K - B, G, R converter 26 to display the image data on a monitor 28 which is ordinarily a color CRT display for simulating final printed matter. Several devices are known for use as this kind of converter. For example, the device disclosed in U.S. application Ser. No. 412,725, now U.S. Pat. No. 4,468,692, can be applied. Converted color component data B, G, R output from the converter 26 are brought to the monitor 28 to be displayed on its screen. By repeating the above-mentioned procedures, the color separation data Y, M, C and K stored in the internal memory undergo layout processing and are transferred to an output memory 22. The data stored in the output memory are then output to a recording module 32 which records a laid-out image according to the data.

In the abovementioned processes, the color separation data Y, M, C and K are needed only for final output and for layout work, so image data stored in the input memory 14, the internal memory 21, and the output memory 22 are not necessary to be the color separation data Y, M, C and K. Paying attention to this factor, this invention adopts a way to store the color component data B, G and R into the memories 14, 21 and 22 instead of storing the color separation data Y, M, C and K, because the volume of the former data is three-fourths of that of the latter data provided that both data have the same density gradation. Moreover, this invention is made to be capable of performing screen tint or flat tone generation, and of recording ruled lines and line images which have been difficult to reproduce in a conventional system.

Figure 2:
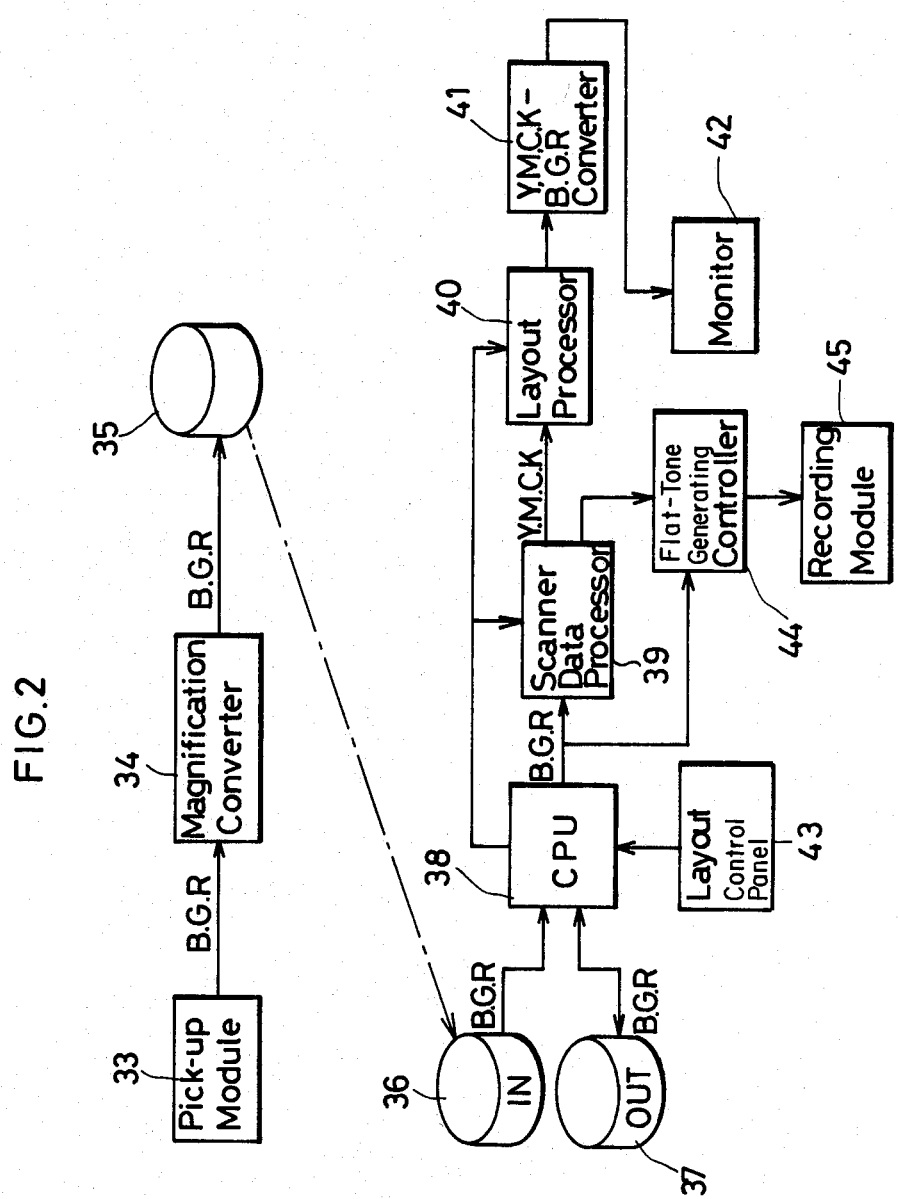
FIG. 2 is a block diagram of an embodiment of a layout scanner system of this invention.

FIG. 2 shows a schematic drawing of an embodiment of this invention. The following description is based on the drawings.

Color component data B, G and R obtained by scanning an original picture with use of a pick-up module 33 are stored into an input memory 35 via a magnification converter 34 unlike the abovementioned conventional methods. This magnification converter 34 can be replaced as follows. Magnification conversion of the sub-scanning direction may be attained by varying a feeding speed ratio between an input head and a recording head, and magnification conversion of the main scanning direction may be attained by using a logic calculator provided in a scanner data processor 39 (mentioned later) as disclosed in United States application Ser. No. 417,437, a continuation application of application Ser. No. 170,127, abandoned, which in turn is a continuation of application Ser. No. 933,714, abandoned. Of course, an analog/digital converter (not shown in the drawings) is provided after the pick-up module 33, which converter converts the form of the color component data B, G and R from analog into digital.

The color component data B, G and R, which are stored into the input memory 35 in the abovementioned manner, are transferred to an internal memory 36 to undergo layout operations and image correction. The color component data B, G and R are converted into color separation data Y, M, C and K by the scanner data processor 39 and undergo a layout process in a layout processor 40 and in subsequent circuits. The scanner data processor 39 has practically the same functions as the computer module 12, including conversion from the color component data B, G and R into color separation data Y, M, C and K, and image processing such as color and gradation correction.

A reason for providing the scanner data processor 39 before the layout processor 40 is to perform layout operations on the color separation data Y, M, C and K.

The color separation data Y, M, C and K are read from the scanner data processor 39 to the layout processor 40 and are displayed as an image on the monitor screen 42. After undergoing layout operations under control of a layout control panel 43, the color component data B, G and R are transferred to an output memory 37. Subsequently, the processed color component data are read from the output memory 37 and converted into color separation data Y, M, C and K by the scanner data processor 39, and output to a recording module 45 to reproduce a laid-out image. In this arrangement, a separate scanner data processor equivalent to the scanner data processor 39 shown in FIG. 2 can be provided for an output path directly between the output memory 37 and the recording module 45, which leads to a more efficient system. In the meantime, the output timing of the data are in accordance with revolution of a recording drum.

Meanwhile, this invention performs screen tint generation or flat tone generation by using a tint laying controller 44, and records ruled lines and drawings in the following way.

At first the system adds specified codes to the data representing one of the B, G and R processed color components, for example to B data. When the specified code is output to the recording module, a designated look-up-table memory outputs data indicating a desired halftone dot percentage which controls a halftone dot generator provided in the recording module 45 to reproduce an image including such tint laying, or screen tint generation. In this process, identification of which of the color component data carries the specified code, and what color and how much halftone dot percentage are required to be performed, can be designated by using a keyboard of the layout control panel 43 and a digitizer in said layout process in a manner well known in the art.

Provided that each of the color component data B, G and R are designated by 8 bit codes, a particular color component data word, for example "11111111" of the B color component data, can be the specified code. Moreover, provided that the screen tint density generation is varied from 0% to 100% in steps of 10%, i.e., by 11 gradations, then 4 data bits are needed to designate a desired half-tone dot percentage for each of the color separations data Y, M, C and K. The 16 bits necessary to designate the half tone density for all of the color separation data providing by using 8 bits of the G color component data for half-tone designation of Y and M color separation data, and by using 8 bits of the R color component data for half-tone designation of C and K color separation data.

Figure 3:
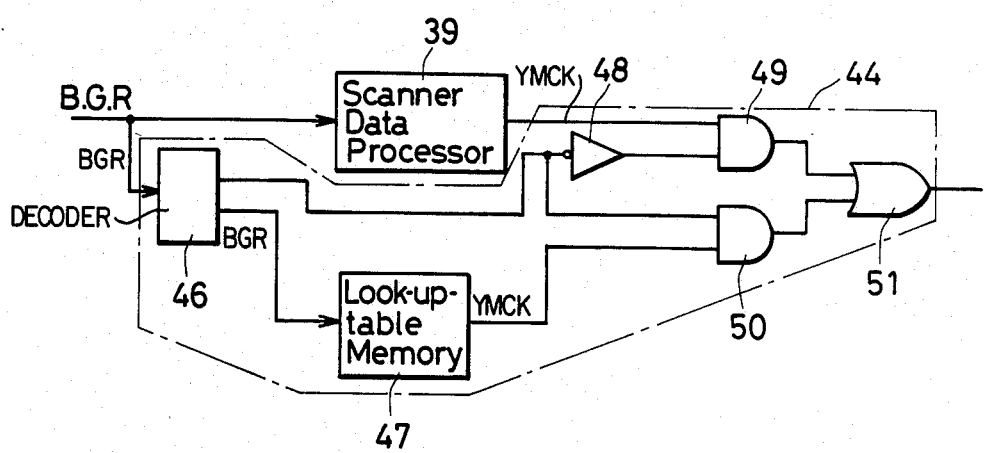
FIG. 3 is an embodiment of a control circuit for screen tint generation.

FIG. 3 is a block diagram of an embodiment of a system to perform tint laying by using said specified code, in which the color component data B, G and R read from the output memory 37 are input to the scanner data processor 39 and to a decoder 46 which decodes the specified code.

When the specified code is not detected, the color separation data Y, M, C and K are read from the scanner data processor 39 via an AND-gate 49 and an OR-gate 51 to the recording module 45 to record a laid-out reproduced image. When the specified code is detected by the decoder 46, a signal corresponding to a desired halftone dot percentage is output from a selected address of a look-up-table memory 47 which is provided for the color separation data Y, M, C and K. This signal is output via an AND-gate 50 and the OR-gate 51 on command of the decoder 46. In the latter case, the color separation data Y, M, C and K from the scanner data processor 39 are blocked at the AND-gate 49 by a code determination signal from the decoder 46, which is inverted in an inverter 48.

Inasmuch as drawings such as block frames and ruled lines and letters can be easily recorded in the above method with a 100% tint laying treatment, this method can also be adapted as follows.

Figure 4:
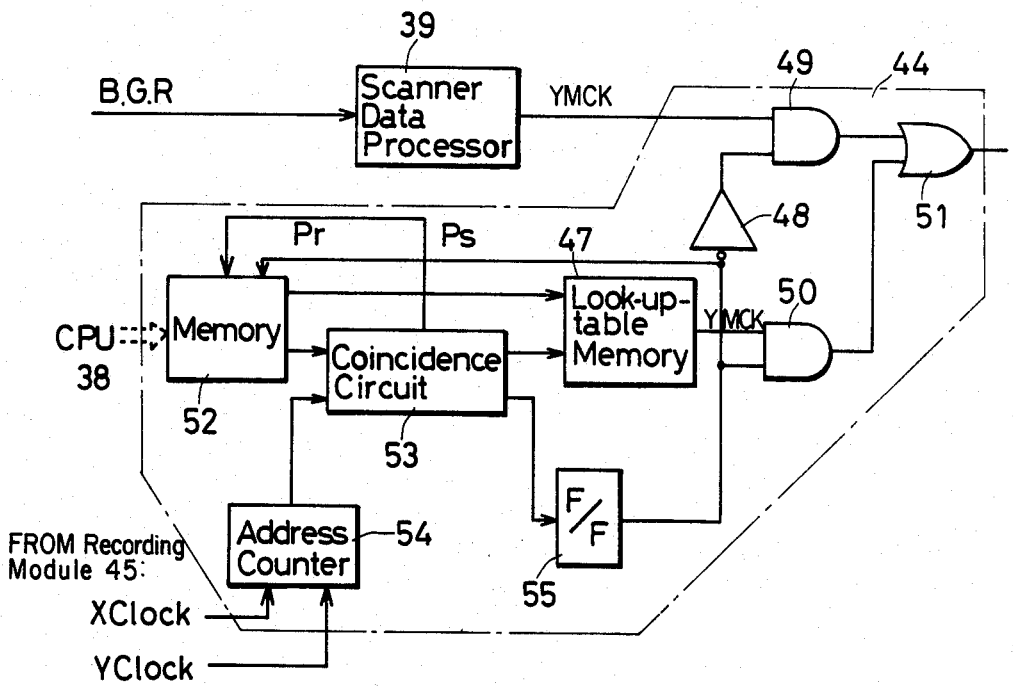
FIG. 4 is another embodiment of a control circuit for screen tint generation.

An alternative approach, as illustrated in FIG. 4, provides an address file memory 52 for storage of addresses, the memory 52 operating separately from the output memory 37. In the memory 52, addresses correspond to the coordinates of points on a recording film at which flat tone generation begins or ends, according to a predetermined relation. When the coordinate values coincide with an address in memory 52, the data from the scanner data processor 39 are blocked and the halftone dot generator is controlled by a signal from the memory 47 at the particular address. This signal corresponds to a specified halftone dot percentage to be recorded on the film by flat tone generation. When the film coordinates do not coincide with addresses in memory 52, a laid-out reproduced image is recorded complying with the color separation data Y, M, C and K from the scanner data processor 39.

Figure 5:
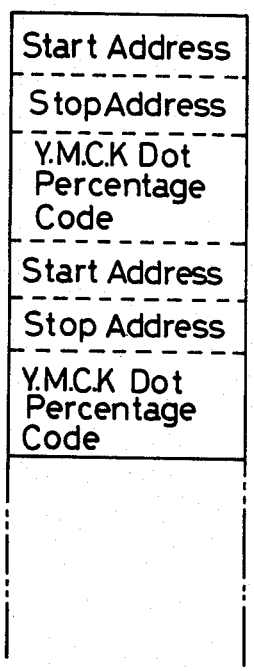
FIG. 5 shows a data content of a memory for address filling shown in FIG. 4.

FIG. 4 is a block diagram of an embodiment using the address file memory 52. The coordinate values of the start and the end point of tint laying on the recording film are used to form address data in a layout process, and the address data are stored into the memory 52 in a form as in FIG. 5 for address filing via the CPU 38.

When X axis clock pulses for the sub-scanning direction and Y axis clock pulses for the main scanning direction are input from the recording module 45 to an XY address counter 54 in accordance with a process of recording scanning, the address signals corresponding to the coordinate value of the scanning point on the film are successively input to a coincidence circuit 53. Address data corresponding to the start point and to the end point of a tint laying region on the film are input to the coincidence circuit 53 from the address file memory 52 for address filing beforehand on command of the CPU 38. At first, a signal from the XY address counter is compared to the address data corresponding to the start point of the tint laying on the film. When the address signal from the recording film coincides with the address data corresponding to the start point for the tint laying on the film, a reset pulse Pr is input from the coincidence circuit 53 to the memory 52 to renew the address data corresponding to the start point of tint laying and the address data corresponding to the end point of tint laying. In accordance with a halftone dot percentage code read from the memory 52 in accordance with the reset pulse Pr, one unit of the look-up-table memory 47 for color separation data Y, M, C and K is selected to output a signal corresponding to the specified halftone dot percentage. On the other hand, a coincidence signal is input from the coincidence circuit 53 to a flip-flop circuit 55 to output a "H" (high level) signal. Such a signal results in sending to the recording module only a signal corresponding to the specified dot percentage via an AND-gate 50 and OR-gate 51. When the signal from the XY address counter 54 corresponds to the address data stored in the coincidence circuit 53 and identifying the end point of tint laying, an output signal Ps from the flip-flop circuit 55 is input to the address file memory 52, to reset the next address data corresponding to the start point of tint laying on the coincidence circuit 53. At the same time, the output signal from the flip-flop circuit 55 changes from "H" to "L" (low level) to block the signal from the look-up-table memory 47 resulting in sending to the recording module the color separation data Y, M, C and K from the scanner data processor 39 via an AND-gate 49 and the OR-gate 51 for recording a laid-out reproduced image.

In the scanner data processor 39, a certain number of look-up-table memory units are provided, each of which has distinct color reproducibility for reproducing varicolored images. When a laid-out image is recorded on a film, the most appropriate of the look-up-table memory units can be selected.

As is mentioned above, the characteristics of this invention are to use the color component data B, G and R as input data to the input memory, internal memory and output memory, to perform screen tint generation or flat tone generation and to record drawings, such as a ruled line, which have previously been a problem to put into practice. The color component data B, G and R are converted into the color separation data Y, M, C and K only in the final output stage, which is highly advantageous in reducing the required memory capacity and consequently in reducing cost of manufacture of the system.

Though the aforesaid embodiment converts the color component data B, G and R into color separation data Y, M, C and K before being brought to the color CRT monitor 42 for use as data for performing layout work simulating actual final printed matter, the method of this invention can perform layout work directly on the color component data B, G and R.

I claim:

1. A method for processing image data in an image reproducing system operable for storing into a primary memory image data obtained by scanning plural original color pictures, performing a layout operation on image data read from the primary memory, storing the data on which the layout operation has been performed into a secondary memory, and recording color separation images Y, M, C and K with a recording scanner by using data read from the secondary memory comprising the steps of:
   (a) storing color component data B, G, and R in said memories; and
   (b) performing a flat tone generating operation on color separation data obtained by conversion of color component data obtained from at least one of said memories for recording said color separation images.

2. A method according to claim 1 in which the flat tone generating operation is performed on color separation data Y, M, C and K which are obtained by converting the color component data B, G and R.

3. A method according to claim 1 in which the layout operation is performed on the color component data B, G and R.

4. A method according to claim 1 comprising the further step of adding specified codes to said color component data for controlling the flat tone generating operation and for specifying halftone dot percentages to be used in said flat tone generating operation.

5. A method according to claim 1 in which the step of performing said flat tone generating operation includes the steps of using flat tone area designation data to designate an area in which a flat tone it to be generated, using color data indicative of a desired color to generate the desired color in the flat tone area, and using halftone data indicative of a desired halftone dot pecentage to generate the desired halftone dot percentage in the flat tone area, said area designation data, said color data, and said halftone data being stored in a memory.

6. A system for processing image data in an image reproducing system operable for storing image data obtained by scanning plural original color pictures into a primary memory, performing a layout operation on image data read from the primary memory, storing the data on which the layout operation has been performed into a secondary memory, and recording color separation images Y, M, C and K with a recording scanner by using data read from the secondary memory wherein:
   (a) said primary and secondary memories store color component data B, G, and R; and comprising:
   (b) a flat tone generating means for performing flat tone generation on color separation data obtained by conversion of color component data obtained from at least one of said memories for recording said color separation images.

7. A system according to claim 6 further comprising a converting means to convert the color component data B, G and R stored in at least one of the memories into color separation data Y, M, C and K before the layout operation is performed.

8. A system according to claim 7 in which said converting means is operable for converting color component data B, G and R read from said secondary memory into color separation data Y, M, C and K for output.

9. A system according to claim 8 wherein said flat tone generating means comprises:
   (a) a decoder means for decoding a flat tone generation operation specifying code for designating a flat tone generation operation and halftone dot percentage codes for designating halftone dot percentages, said flat tone generation operation specifying code and said halftone dot percentage codes being contained in the color component data B, G and R stored in said secondary memory;
   (b) a look-up-table memory which outputs a halftone dot signal corresponding to said halftone dot percentage codes decoded by said decoder means; and
   (c) a switching means which switches between an output of said converting means and an output of said look-up-table memory responsive to said flat tone generation operation specifying code decoded by said decoder.

10. A system according to claim 7 further comprising:
   (a) a mmeory storing data corresponding to coordinates of a start and an end point of a flat tone area to be generated on a recording drum, a desired color to be generated therein, and halftone dot percentages therefor,
   (b) an address counter means for outputting signals corresponding to coordinates on the recording drum,
   (c) a coincidence circuit which detects coincidence between said coordinates stored in said memory and the signals output from the address counter means,
   (d) a look-up-table memory which outputs data corresponding to said halftone dot percentages from a time that said coincidence circuit detects coincidence between a coordinate on the drum and the coordinate of the start point of the flat tone area to a time that said coincidence circuit detects coincidence between a coordinate on the drum and the coordinate of the end point of the flat tone area, and
   (e) a switching means which switches between an output of said look-up-table memory and an output of said converting means responsive to an output from said coincidence circuit.

11. A system according to claim 6 further comprising a means for transferring the color component data B, G and R directly to a layout operation means.

12. A method for processing image data in an image reproducing system comprising the steps of:
   (a) scanning an original image,
   (b) producing B, G and R data representative thereof,
   (c) storing said B, G and R data in a first memory means,
   (d) extracting said B, G and R data from said first memory means for performing a layout operation thereon,
   (e) converting said extracted B, G and R data to Y, M, C and K color separation data for performing said layout operation,
   (f) manipulating said B, G and R data in accordance with an image obtained from said Y, M, C and K data,
   (g) transferring said B, G and R data to a second memory means subsequent to manipulation thereof,
   (h) outputting said B, G and R data for conversion to Y, M, C and K data for reproducing an image via a recording module,
   (i) incorporating predetermined codes in said B, G and R data for identifying predetermined characteristics of flat tones to be reproduced in specified areas, and
   (j) reproducing said flat tones in said specified areas in accordance with the codes incorporated in said B, G and R data.

13. A method according to claim 12 wherein said incorporating step includes the steps of incorporating a first predetermined code in at least one of said B, G and R data of identify a flat tone reproducing operation, and incorporating in others of said B, G and R data other predetermined codes specifying halftone dot data for four color separation colors.

14. A method according to claim 13 including the further steps of:
   (a) decoding said at least one of said B, G and R data to detect said first predetermined code identifying a flat tone reproducing operation,
   (b) when said first predetermined code identifying a flat tone reproducing operation is not detected, converting said B, G and R data to Y, M, C and K data to control said recording module,
   (c) when said first predetermined code identifying a flat tone reproducing operation is detected, blocking conversion of said B, G and R data to Y, M, C and K data and generating a flat tone indicating signal, and
   (d) outputting halftone dot data for said four color separation colors in accordance with said other predetermined codes specifying halftone dot data incorpoated in said others of said B, G and R data when said first predetermined code identifying a flat tone reproducing operation is detected.

* * * * *